United States Patent [19]

Jessup

[11] 4,355,298
[45] Oct. 19, 1982

[54] LOW OR FLAT TIRE WARNING SYSTEM

[75] Inventor: Gregory M. Jessup, Marion, Iowa

[73] Assignee: The Bendix Corporation, Southfield, Mich.

[21] Appl. No.: 234,522

[22] Filed: Feb. 17, 1981

Related U.S. Application Data

[63] Continuation of Ser. No. 67,868, Aug. 20, 1979, abandoned.

[51] Int. Cl.$^3$ .............................................. B60C 23/00
[52] U.S. Cl. .................................. 340/58; 200/61.22; 73/146.2
[58] Field of Search ............ 340/58; 200/61.22, 61.25, 200/61.26; 73/146, 146.2

[56] References Cited

U.S. PATENT DOCUMENTS

| | | | |
|---|---|---|---|
| 3,374,460 | 3/1968 | Massoubre | 340/58 |
| 3,614,732 | 10/1971 | Lejeune | 340/58 |
| 3,645,479 | 2/1972 | Kostroun et al. | 244/103 R |
| 3,707,701 | 12/1972 | Neu | 340/58 |
| 4,102,184 | 7/1978 | Castleberry | 73/146.2 |
| 4,103,283 | 7/1978 | Lee | 340/58 |
| 4,110,732 | 8/1978 | Jarocha et al. | 340/58 |

Primary Examiner—Alvin H. Waring
Attorney, Agent, or Firm—William A. Marvin; Ken C. Decker

[57] ABSTRACT

An aircraft low or flat tire flight deck warning system monitors the rotational speed and thus, the condition of the tires. A differential tire rotational speed signal is compared to a variable reference by a comparator which generates a warning signal when the differential signal is greater than or equal to the reference. The reference signal is derived from one of the tire rotation signals or from an independent ground speed signal and is therefore proportional to the rotational speed of a properly inflated tire and to the aircraft ground speed. Separate references and comparators cooperate to generate separate warning signals for distinct dangerous tire conditions. The warning signals are inhibited under a variety of conditions.

5 Claims, 2 Drawing Figures

LOW OR FLAT TIRE WARNING SYSTEM

This is a continuation, of application Ser. No. 67,868, filed Aug. 20, 1979 now abandoned.

BACKGROUND OF THE INVENTION

Previous tire condition warning systems have operated on the principle that an under-inflated tire with a smaller rolling radius will rotate faster than a properly inflated tire travelling at the same speed. Such warning systems have compared a differential signal proportional to the difference between the rotation speeds of a pair of tires to a set reference signal which represents a particular differential signal magnitude corresponding to a particular dangerous tire condition at a particular vehicle speed.

However, such systems have a shortcoming. For example, a particular radii differential may produce a speed differential signal which exceeds the reference value at a high speed, but at a lower speed this same radii differential may produce a speed differential signal which is less than the reference value. This is because for a particular rolling radius differential the speed differential varies as the aircraft ground speed varies. As a solution to this problem, the present invention utilizes a variable reference which varies as the aircraft ground speed varies. In this manner a particular radii differential produces a speed differential signal which may attain the reference level at any aircraft ground speed.

SUMMARY OF THE INVENTION

An aircraft low or flat tire warning system includes sensors which produce rotation signals proportional to the angular velocity of the tires. An under inflated tire rotates faster than a properly inflated tire due to its smaller rolling radius. The warning system includes a differential comparator whose output is proportional to the differential between a pair of tire rotation speeds. This rotation speed differential is compared to a reference signal by a warning comparator which produces a warning signal when the differential is not less than the reference signal. The reference signal is produced so that it is proportional to the aircraft ground speed. The reference signal thus represent a particularly dangerous tire condition at any aircraft ground speed. The warning system includes means for inhibiting the warning signal under a variety of conditions. The warning system may include a plurality of reference signal generators with separate warning comparators so that different warning signals can be generated to represent distinct dangerous tire conditions.

It is an object of this invention to give a warning of a low or flat tire condition to an aircraft crew in the cockpit of the aircraft without relying on pilot "feel" of the aircraft.

It is an object of this invention to utilize the principle that wheels of differing radii travelling at the same velocity will rotate with different angular velocities.

It is an object of this invention to produce a reference signal which varies proportionally to the aircraft ground speed so that it may represent a particularly dangerous tire condition or radii differential at any aircraft ground speed.

It is an object of this invention to derive a reference signal from a signal proportional to the angular velocity of a properly inflated tire.

It is an object of this invention to produce a warning system which can be inhibited under a variety of conditions.

It is an object of this invention to produce a tire condition warning system which is capable of distinguishing between a plurality of dangerous tire conditions.

Finally, it is an object of this invention to produce a tire condition warning system which is capable of operating in an aircraft where strut or bogie stiffness precludes a radius differential between bogie wheels.

DETAILED DESCRIPTION

Figure 1:
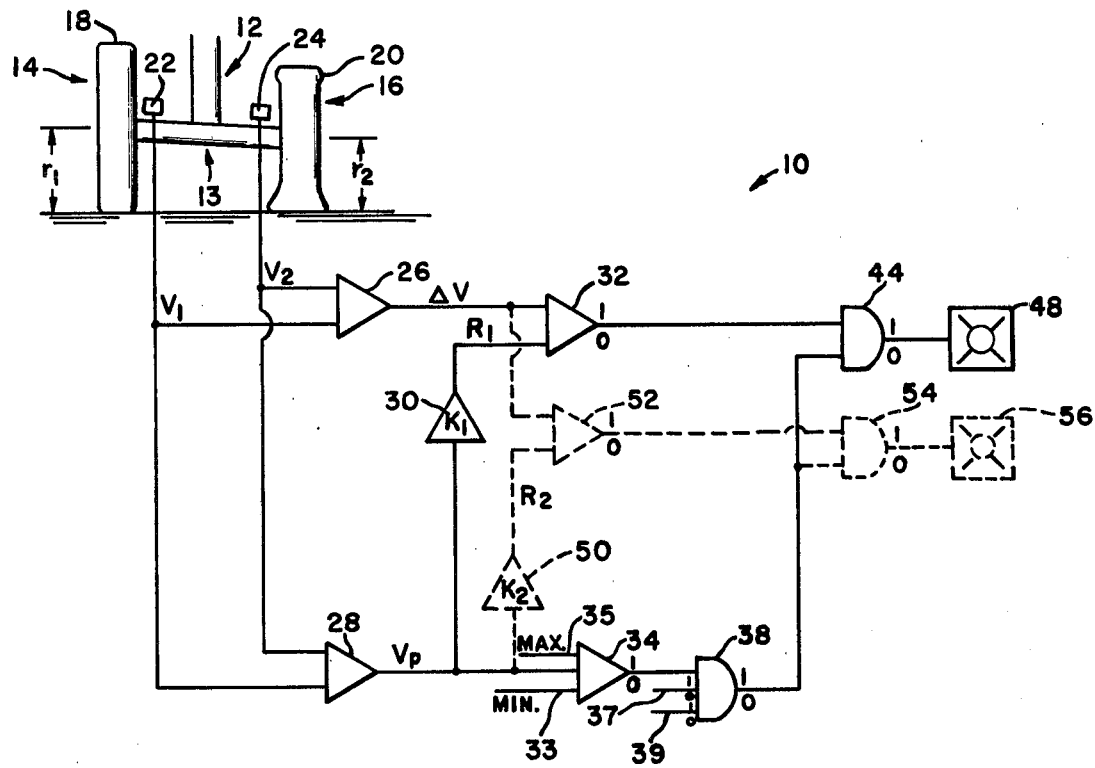
FIG. 1 is a logic diagram of one embodiment of the applicant's invention.

An aircraft tire condition warning system 10 is illustrated in FIG. 1. An aircraft bogie 13 includes wheel strut 12 and wheels 14 and 16 with tires 18 and 20.

Associated with the wheels are wheel rotation speed sensors 22 and 24. Sensors 22 and 24 produce rotation signals $V_1$ and $V_2$ which are proportional to the angular velocity of wheels 14 and 16, respectively.

Differential comparator 26 receives both rotation signals $V_1$ and $V_2$ and produces a differential signal $\Delta V$ representing the absolute value of the difference between rotation signals $V_1$ and $V_2$. It follows that the differential signal $\Delta V$ is proportional to the difference in angular velocity or rotational speeds of wheels 14 and 16.

The rotation signals $V_1$ and $V_2$ are also received by selection comparator 28. Comparator 28 compares $V_1$ to $V_2$ and selects the lesser of $V_1$ and $V_2$ as its output signal $V_p$. The output signal $V_p$ is proportional to the angular velocity of whichever of the wheels 14 and 16 is rotating slower than the other, and thus to whichever of the wheels 14 and 16 has the larger rolling radius due to proper tire inflation.

A reference signal generator 30 receives the selected or output signal $V_p$ of selection comparator 28 and multiplies the output signal $V_p$ by a fractional constant $K_1$ to obtain a reference signal $R_1 = K_1 \times V_p$. The constant $K_1$ is chosen so that the reference signal $R_1$ is equivalent to the differential signal $\Delta V$ which would result when one of the tires 18 or 20 is low or flat by a predetermined amount. The reference signal $R_1$ produced in this manner is proportional to the aircraft ground speed. Since tire size, wheel load and bogie or strut stiffness influences the choice of the constant $K_1$, the value of $K_1$ must be determined for each model of aircraft.

A primary warning comparator 32 compares the differential signal $\Delta V$ to the reference signal $R_1$. The output of comparator 32 is a logic zero (0) when the differential signal $\Delta V$ is less than the reference signal $R_1$. Comparator 32 produces a warning signal or a logic one (1) output when the differential signal $\Delta V$ is greater than or equal to the reference signal $R_1$.

An inhibit comparator 34 compares the output signal $V_p$ of comparator 28 to a pair of signals 33 and 35. Signals 33 and 35 represent minimum and maximum aircraft ground speeds, respectively, and can be preset at various levels for different aircraft types. The output of inhibit comparator 34 is a logic one (1) when the aircraft ground speed (represented by output signal $V_p$) is between the minimum and maximum levels represented by signals 33 and 35. The minimum speed is determined by system accuracy and the maximum speed is determined by instability at high speeds.

AND gate 38 receives the output of inhibit comparator 34 and any number of additional inhibit signals representing various conditions under which it is desired to inhibit the warning signal generated by the warning comparator 32. For example, inhibit signal 37 is a logic 1 or 0 depending on whether the aircraft is travelling straight or is turning, respectively. Similarly, inhibit signal 39 is a logic 1 or 0 depending upon whether the aircraft is travelling on a level runway or is on a runway with a side slope, respectively. To accomplish this AND gate 38 receives input signal 37 from the front wheel steering system. Input signal 39 is received from a sensor which senses whether or not the aircraft is on a steep side slope which would cause unequal wheel loading.

AND gate 44 receives the output of warning comparator 32 and the output of AND gate 38. When the output of warning comparator 32 is a logic 1 and none of the inhibit conditions exist, the output of AND gate 44 is a logic 1 and the warning indicator 48 in the aircraft cockpit is activated to warn the pilot that a dangerous tire condition exists. A separate warning indicator or warning light is associated with each wheel pair.

Extreme stiffness of the aircraft bogie 13 or strut 12 may cause load shifting from the tire with low pressure to the tire with proper pressure and thus preclude any difference between the rolling radii of opposing bogie wheels. In this case when a tire is under inflated, the rolling radii of both tires are shortened simultaneously and the angular velocity of both wheels correspondingly increases by the same amount. As a result, the differential signal $\Delta V$ of the differential comparator 26 of FIG. 1 will remain essentially zero and the warning system illustrated in FIG. 1 will not function. However, the warning system of FIG. 1 can be adapted to function in the case of extreme bogie stiffness with the addition of an independent aircraft ground speed pickup 60 to generate the signal $V_p$ representing the angular velocity of a wheel with a proper rolling radius.

Figure 2:
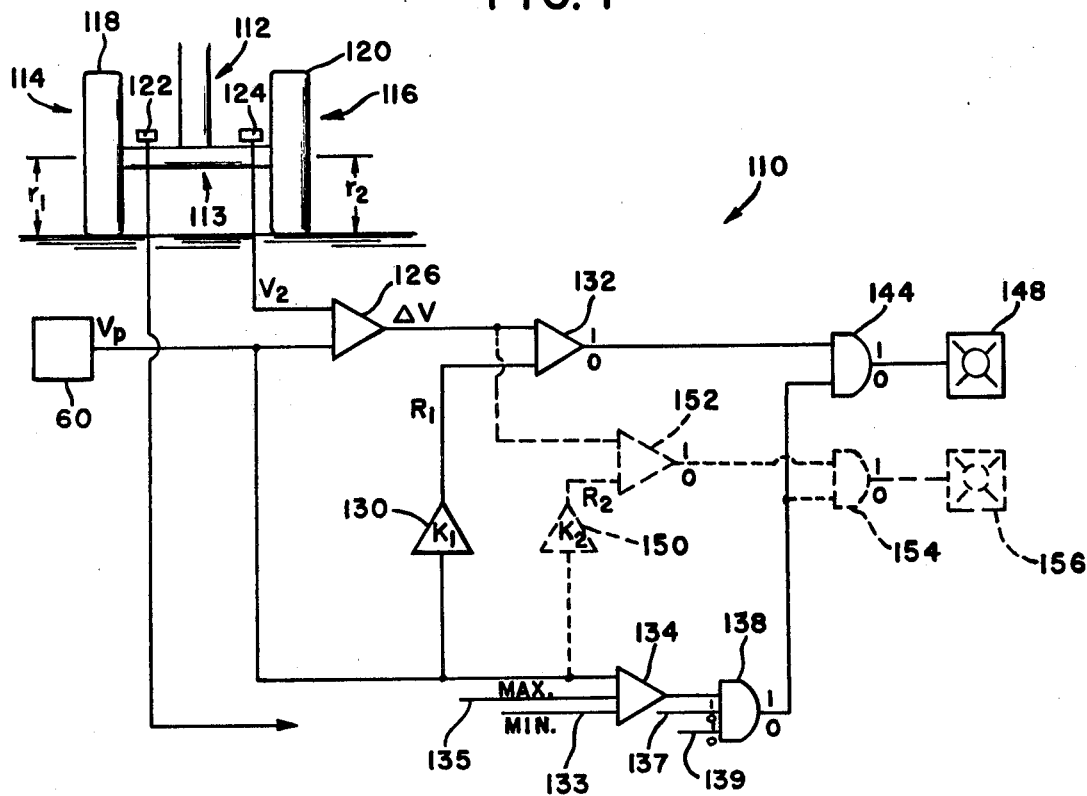
FIG. 2 is a logic diagram of a second embodiment of the applicant's invention.

FIG. 2 illustrates the alternate embodiment of the applicant's tire condition warning system with the independent ground speed pickup 60 for use in an aircraft where bogie or strut stiffness precludes a rolling radius differential between bogie wheels. It should be noted that the alternate warning system illustrated in FIG. 2 can be utilized as well in an aircraft where bogie or strut stiffness does not preclude a rolling radius differential. Most of the components of the alternate embodiment perform the same function as their counterparts in the first embodiment. Such components are referred to by numerals arrived at by adding 100 to the reference numerals of FIG. 1.

In the alternate embodiment of FIG. 2, an independent ground speed pickup 60 is calibrated to produce an output signal $V_p$ proportional the angular velocity of a wheel with a proper rolling radius and thus, to the aircraft ground speed. Such an independent ground speed pickup could be comprised of ground speed radar, or of rotational speed sensors associated with the front wheels or with a non-load bearing constant radius wheel adapted for ground speed sensing.

The angular velocity of each wheel and tire, represented by signal $V_2$ is then compared to the independent ground speed signal $V_p$ by differential comparator 126. Differential comparator 126 produces differential signal $\Delta V$ proportional to the absolute value of the difference between signals $V_p$ and $V_2$.

The embodiment of FIG. 2 dispenses with the comparator 28 of the embodiment of FIG. 1. Instead, the output of ground speed pickup $V_p$ is received directly by the reference signal generator 130. Reference signal generator 130 then multiplies $V_p$ by the predetermined constant $K_1$ to produce the reference signal $R_1$. The result is a reference signal $R_1$ which is proportional to or a function of the aircraft ground speed just as was the reference signal $R_1$ of the first embodiment.

Reference signal $R_1$ is then compared to differential signal $\Delta V$ by warning comparator 132. Warning comparator 132 and the remaining components illustrated in FIG. 2 are analogous to their counterparts illustrated in FIG. 1. The inhibiting circuitry illustrated in FIG. 2, including elements 134, 138 and 144, is the same as that of the embodiment of FIG. 1. A separate rotational speed sensor, such as sensor 124, and a separate warning circuit and warning indicator 148, such as illustrated in FIG. 2, is associated with each aircraft tire it is desired to monitor. In this manner the condition of each tire can be independently monitored.

In both the embodiments illustrated in FIGS. 1 and 2 it is possible to produce distinct warning signals for more than one distinct dangerous tire condition. For example, it may be desired to produce one warning signal when a tire is only slightly under inflated and to produce a second warning signal when the same tire is greatly under inflated. This multiple condition warning can be accomplished by the elements and circuitry illustrated by dashed lines in FIGS. 1 and 2.

Referring to both FIGS. 1 and 2, additional reference signal generators 50, 150 receive the output signal $V_p$. The reference signal generators 50, 150 multiply $V_p$ by predetermined constants $K_2$, different from constants $K_1$, to generate the reference signals $R_2$ which in turn represent dangerous tire conditions distinct from those represented by the reference signal $R_1$. Reference signals $R_2$ are proportional to or a function of the aircraft ground speed. Warning comparators 52, 152 then compare the reference signals $R_2$ with the differential signals $\Delta V$ to produce warning signals in the same manner as warning comparators 32 and 132. AND gates 54, 154 receive the outputs of warning comparators 32 and 132, respectively and the outputs of AND gates 38 and 138, respectively. The outputs of AND gates 54 and 154 then either permit or inhibit the actuation of warning indicators 56 and 156.

MODE OF OPERATION

A pair of wheels 14, 16 with tires 18, 20 and strut 12 are included in an aircraft bogie 13 as illustrated in FIG. 1.

The angular velocity of each wheel depends upon the ground speed of the aircraft while taxiing and upon the rolling radii of the wheels $r_1$, $r_2$. In turn, the rolling radii $r_1$, $r_2$ depend on the load carried by the bogie, the bogie stiffness and the air pressure within the tires associated with wheels 14 and 16 respectively.

When both tires 18, 20 are properly inflated, then both have the same rolling radius, and thus both rotate with the same angular velocity no matter what the aircraft ground speed. In this case the output of the differential comparator 26 is equal zero and no warning signal is generated by warning comparator 32 and to activate warning indicators 48, 56.

However, an under inflated or flat tire has a smaller rolling radius than a properly inflated tire and, therefore, has a greater angular velocity during straight and level aircraft travel. FIG. 1 illustrates the case where one of the tires, tire 20, is under inflated. This causes wheel 16 to have a smaller rolling radius $r_2$ than the rolling radius $r_1$ of wheel 14. Since the ground speed of both wheels is identical, wheel 17 must have a higher angular velocity or rotational speed than wheel 14. The difference in angular velocity is represented by a non-zero differential signal $\Delta V$ at the output of differential comparator 26. It should be noted that for a particular rolling radius differential $r_1 - r_2$, the differential signal $\Delta V$ varies as a direct proportion of the aircraft ground speed.

Since wheel 14 is rotating slower than wheel 16, rotation signal $V_1$ is less than rotation signal $V_2$ and the output of the selection comparator $V_p$ is equal to $V_1$ which is proportional to the angular velocity of the properly inflated wheel 14. $V_p$ is then multiplied by constant $K_1$ by the reference signal generator 30 to produce reference signal $R_1$. $K_1$ is chosen so that $R_1$ is equivalent to the differential signal $\Delta V$ which would result from a particular rolling radius differential associated with a dangerous tire condition. Since $V_1$ is proportional to the aircraft ground speed and $K_1$ is a constant, it follows that $R_1$ is also proportional to the aircraft ground speed. As a result, the reference signal $R_1$ represents that particular rolling radius differential or dangerous tire condition at any aircraft ground speed.

As long as tire 20 has sufficient pressure so that the rolling radius differential $r_1 - r_2$ is less than the predetermined dangerous amount represented by $R_1$, $\Delta V$ is less than $R_1$ and the warning comparator 32 does not produce a warning signal. However, as the tire 20 continues to deflate, the difference between radius $r_1$ and $r_2$, the difference in angular velocities of wheels 14 and 16, and thus the magnitude of $\Delta V$ eventually equals or exceeds the predetermined differential value represented by reference signal $R_1$. At this point, warning comparator 32 produces a warning signal or a logic one (1) signal which, if not inhibited, activates the warning indicator 48.

Inhibit comparator 34 operates to inhibit the activation of warning indicator 48 unless the ground speed of the aircraft is within a predetermined range defined by lower and upper speed limits represented by signals 33 and 35, respectively. AND gate 38 inhibits the warning system unless the aircraft is travelling straight on a level runway. AND gate 44 cooperates with inhibit comparator 34, AND gate 38 and warning comparator 32 to prevent the warning signal generated by comparator 32 from activating indicator 48 unless none of the inhibit conditions mentioned above exist.

The warning system illustrated in FIG. 2 operates essentially the same as that of FIG. 1. The key difference is that, in the embodiment of FIG. 2, instead of selecting one of the wheel rotation speed signals $V_1$ or $V_2$ to represent the aircraft ground speed, an independent ground speed pickup 60 is used to generate signal $V_p$ proportional to the aircraft ground speed. The differential signal $\Delta V$ is then produced by differential comparator 126 which compares the wheel rotation signal of a wheel to $V_p$, rather than by comparing the wheel rotation signals with each other. The reference signal $R_1$ is derived from the independent ground speed signal $V_p$ by reference signal generator 130 rather than from the output of selection comparator 28 as in the embodiment of FIG. 1.

Warning comparator 132 compares the differential signal $\Delta V$ to the reference signal $R_1$ to produce a warning signal in the same manner as did warning comparator 32 of the previous embodiment. Inhibit comparator 134 receives the output of ground speed pickup 60 rather than the output of selection comparator 28. Except for this, inhibit comparator 134, AND gates 138 and 144 operate to prevent activation of indicator 148 just as did the corresponding elements of the embodiment illustrated in FIG. 1.

Both the embodiments illustrated in FIGS. 1 and 2 are capable of warning the pilot of a plurality of tire conditions by the addition of elements such as those indicated in dashed lines in FIGS. 1 and 2. For example, suppose the primary reference signal $R_1$ is set to represent the condition wherein a tire is deflated so that its rolling radius is 6 inches smaller than is proper. Also suppose that it is desired to activate a separate warning indicator when a tire is only 3 inches low. This can be accomplished with the additional reference signal generators 50 and 150, the warning comparators 52 and 152 and AND gates 54 and 154 of FIGS. 1 and 2 by choosing the multiplier $K_2$ so that $R_2$ represents the condition where a tire rolling radius is 3 inches below normal.

As a tire deflates its rolling radius decreases. Eventually, its rolling radius will be 3 inches less than normal. At this point the differential signal $\Delta V$ equals $R_2$ and the warning comparators 52 and 152 produces a warning signal. Meanwhile, $\Delta V$ still is less than $R_1$, so no warning signal is generated by warning comparators 32 or 132. As a result, assuming no inhibit conditions exist, indicators 56 and 156 is activated while indicators 48 and 148 remain inactivated. This informs the pilot that the tire is at least 3 inches low, but is not yet 6 inches low. When the tire deflates further to the point where it is 6 inches low, both indicators are then activated.

I claim:

1. An aircraft tire condition warning system for an aircraft bogie with two wheels having tires mounted thereon, said warning system comprising:
    a speed sensor associated with one of the wheels for generating a speed signal proportional to the angular velocity of said one wheel;
    a speed sensor associated with the other of said two wheels for generating a speed signal proportional to the angular velocity of said other wheel;
    means for differencing the two speed signals and for generating a differential signal proportional to the difference in angular velocity therebetween;
    means for comparing the two speed signals and for generating a ground speed signal which is the smaller of the two speed signals wherein said ground speed signal is proportional to the aircraft ground speed of a wheel having a properly inflated tire thereon;
    means for generating a reference signal by multiplying said ground speed signal times a proportionality constant indicative of a dangerous tire condition, said reference signal thereby varying with the ground speed of the aircraft;
    means for comparing said differential signal and said reference signal and for generating a warning signal when said differential signal exceeds said reference signal; and
    means for generating an operator identifiable warning indication in response to said warning signal.

2. An aircraft tire condition warning system as defined in claim 1, further including:

means, receiving said reference signal as an indication of aircraft ground speed, for inhibiting said warning signal to said indication generating means if the ground speed of the aircraft is greater than a predetermined maximum or less than a predetermined minimum.

3. An aircraft tire condition warning system as defined in claim 2 further including:

means for inhibiting said warning signal to said indication generating means if the aircraft is executing a turn on the runway.

4. An aircraft tire condition warning system as defined in claim 3, further including:

means for inhibiting said warning signal to said indication generating means if the aircraft is traveling along a sideslope on the runway.

5. An aircraft tire condition warning system as defined in claim 1 which further comprises:

at least one other means for generating at least one other reference signal proportional to said ground speed signal, each of said other reference signals having a different proportionality constant than said reference signal, each of said proportionality constants being indicative of a different dangerous tire condition; and at least one other means for comparing said differential signal to said other reference signals and for generating at least one other warning signal when said differential signal exceeds said other reference signals.

* * * * *